United States Patent
Amer-Yahia et al.

(10) Patent No.: US 8,285,483 B2
(45) Date of Patent: Oct. 9, 2012

(54) CONSTRUCTING TRAVEL ITINERARIES FROM TAGGED GEO-TEMPORAL PHOTOGRAPHS

(75) Inventors: Sihem Amer-Yahia, New York, NY (US); Munmun De Choudhury, Tempe, AZ (US); Moran Feldman, Haifa (IL); Nadav Golbandi, Haifa (IL); Ronny Lempel, Haifa (IL); Cong Yu, Hoboken, NJ (US)

(73) Assignee: Yahoo! Inc., Sunnyvale, CA (US)

( * ) Notice: Subject to any disclaimer, the term of this patent is extended or adjusted under 35 U.S.C. 154(b) by 415 days.

(21) Appl. No.: 12/708,321

(22) Filed: Feb. 18, 2010

(65) Prior Publication Data
US 2011/0202267 A1    Aug. 18, 2011

(51) Int. Cl.
*G01C 21/00* (2006.01)
*G06F 19/00* (2006.01)

(52) U.S. Cl. ............... 701/428; 701/533; 705/6

(58) Field of Classification Search .............. 701/428, 701/437, 533; 705/6, 14; 348/211.3; 715/723, 715/202
See application file for complete search history.

(56) References Cited

U.S. PATENT DOCUMENTS
6,199,014 B1 * 3/2001 Walker et al. ............... 701/428
7,865,306 B2 * 1/2011 Mays ............... 701/437

OTHER PUBLICATIONS

Ahern, S. et al., "World explorer: Visualizing aggregate data from unstructured text in geo-referenced collections," *Proc. Joint Conference on Digital Libraries (JCDL '07)*, 1-10, Jun. 2007.
Ardissono, L. et al., Intrigue: Personalized recommendation of tourist attractions for desktop and handset devices. *Applied Artificial Intelligence*, 17(8-9) 687-714, 2003.
Bansal, N. et al., "Approximation algorithms for deadline-tsp and vehicle routing with time-windows," *STOC*, 166-174, Jun. 2004.
Chekuri, C. et al., "Approximation algorithms for orienteering with time windows," Archived at The Computing Research Repository (CoRR), 2007.
Chekuri, C. et al., "Improved algorithms for orienteering and related problems," *SODA*, 661-670, 2008.
Chekuri, C. et al., "A recursive greedy algorithm for walks in directed graphs," *FOCS*, 245-253, 2005.
Cheverst, K. et al., "Developing a context-aware electronic tourist guide: some issues and experiences," *CHI '00: Proceedings of the SIGCHI conference on Human factors in computing systems*, 17-24, 2000.

(Continued)

*Primary Examiner* — Tan Q Nguyen
(74) *Attorney, Agent, or Firm* — Berkeley Law & Technology Group, LLP

(57) ABSTRACT

One embodiment accesses two or more photos taken by one or more travelers at one or more destinations and one or more points-of-interest located within the destinations; constructs one or more photo streams for each unique traveler-destination combination, wherein each one of the photo streams comprises two or more of the photos taken by the corresponding traveler at the corresponding destination; maps each one of the photos to one of the points-of-interest; constructs one or more timed paths for each unique traveler-destination combination based on the photo streams and the mapping between the photos and the points-of-interest, wherein each one of the timed paths comprises one or more of the points-of-interest located within the corresponding destination and visited by the corresponding travel; and constructs an itinerary based on a start point-of-interest, an end point-of-interest, a time constraint, and the timed paths.

18 Claims, 5 Drawing Sheets

OTHER PUBLICATIONS

Crandall, D. et al., "Mapping the world's photos," *Proc. 18th International World Wide Web Conference (WWW'2009)*, 761-770, Apr. 2009.

Dunstall, S. et al., "An automated itinerary planning system for holiday travel," *Information Technology and Tourism*, 6(3), 2004.

Garey, M. R. et al. *Computers and Intractability, A Guide to the Theory of NP-Completeness*, 1979.

Girardin, F. *Aspects of implicit and explicit human interactions with ubiquitous geographic information.* PhD thesis, Universitat Pompeu Fabra, Barcelona, Spain, 2009.

Girardin, F. et al., "Digital footprinting: Uncovering tourists with user-generated content.," *EEE Pervasive Computing*, 7(4) 36-43, 2008.

Girardin, F. et al., "Leveraging explicitly disclosed location information to understand touristic dynamics: A case study," *Journal of Location-Based Services*, 2(1):41-54, 2008.

Leake, D. et al., "Mining large-scale knowledge sources for case adaptation knowledge," *Proc. ICCBR 2007*, 209-223, 2007.

Leake, D. et al., "Knowledge planning and learned personalization for web-based case adaptation," *Proc. ECCBR 2008*, 284-298, 2008.

Popescu, A. et al., "Deducing trip related information from Flickr," *Proc. 18th International World Wide Web Conference (WWW'2009)*, 1183-1184, Apr. 2009.

Rattenbury, T. et al., "Toward automatic extraction of event and place semantics from Flickr tags," Pr*oc. 30th Annual International ACM SIGIR Conference on Research and Development in Information Retrieval (SIGIR'07)*, 103-110, Jul. 2007.

Tai, C. H. et al., "Recommending personalized scenic itinerary with geo-tagged photos," *Proc. IEEE International Conference on Multimedia and Expo (ICME'2008)*, 1209-1212, 2008.

"Google City Tours," downloaded from http://citytours.googleabs.com/?reset=true, Feb. 4, 2010.

* cited by examiner

CONSTRUCTING TRAVEL ITINERARIES FROM TAGGED GEO-TEMPORAL PHOTOGRAPHS

TECHNICAL FIELD

The present disclosure generally relates to constructing travel itineraries.

BACKGROUND

For any traveler traveling to any destination, the traveler or someone connected with the traveler typically plan and prepare an itinerary for the trip. However, travel itinerary planning is often a difficult and time consuming task, especially for a traveler visiting a destination for the first time. Often, planning a travel itinerary involves substantial research to identify points-of-interest (POIs) at the destination worth visiting, the time worth spending at each POI, and the time it may take to travel from one POI to another POI. Without any prior knowledge, one must rely on travel books, personal travel blogs, or a combination of online resources and services such as travel guides, map services, public transportation sites, and human intelligence to piece together an itinerary.

All these options have shortcomings. Travel books do not cover all cities and locations and, perhaps more importantly, are not free. Personal travel blogs reflect individual person's view, with no guarantees provided over the writer's experience or the amount of preparation invested in planning the trip. Finally, compiling an itinerary by selecting individual POIs and researching their to's and fro's is a task that is both time consuming and requires significant research expertise.

SUMMARY

The present disclosure generally relates to constructing travel itineraries.

Particular embodiments access two or more photos, wherein each one of the photos is associated with a location and a time at which the photo is taken, and taken by one of one or more travelers while visiting one of one or more destinations, and one or more points-of-interest, wherein each one of the points-of-interest is located within one of the destinations. Particular embodiments construct one or more photo streams for each unique traveler-destination combination, wherein each one of the photo streams comprises two or more of the photos taken by the corresponding traveler at the corresponding destination and ordered according to the respective times at which the photos are taken. Particular embodiments map each one of the photos to one of the points-of-interest. Particular embodiments construct one or more timed paths for each unique traveler-destination combination based on the photo streams and the mapping between the photos and the points-of-interest, wherein each one of the timed paths comprises one or more of the points-of-interest located within the corresponding destination, for each one of the points-of-interest located within the corresponding destination, a visit time representing a first amount of time the corresponding traveler spends at the point-of-interest, and for each one of one or more pairs of points-of-interest located within the corresponding destination, a transit time representing a second amount of time it takes the corresponding traveler to travel from a first one of the pair of points-of-interest to a second one of the pair of points-of-interest. Particular embodiments construct an itinerary based on a start point-of-interest, an end point-of-interest, a time constraint, and the timed paths.

These and other features, aspects, and advantages of the disclosure are described in more detail below in the detailed description and in conjunction with the following figures.

DETAILED DESCRIPTION

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

With the advancement of digital photography and the rapid rise of rich media sharing sites such as Flickr (http://www.flickr.com/) and Picasa™ Web Albums (http://picasaweb.google.com), millions of travelers are now sharing their travel experiences through rich media data such as photographs. More interestingly, users are increasingly associating shared media with rich contextual information. Flickr photos, for example, are usually time-stamped by the date and time of when they were taken. Furthermore, they are often tagged with geographical information (e.g., latitudes and longitudes) on where the photos were taken, which may be mapped to specific POIs. Even more frequently, the photos are associated with textual metadata such as tags, titles, notes, and descriptions. Such shared photos may be seen as billions of geo-temporal breadcrumbs that may promisingly serve as a latent source reflecting the trips of millions of travelers.

Particular embodiments may take advantage of the rich information provided by these shared photos together with their associated metadata and automatically construct travel itineraries, and more importantly, travel itineraries at a large scale, from these breadcrumbs (i.e., the information that may be extracted from the photos and their metadata). For example, by analyzing these breadcrumbs associated with a traveler's photo stream, particular embodiments may deduce the cities visited by the traveler, which POIs that traveler took photos at, how long that traveler spent at each POI, and what the transit time was between POIs visited in succession. By aggregating such timed paths of many travelers, particular embodiments may construct itineraries that reflect the "wisdom" of the touring crowds. Each such itinerary may be comprised of a sequence of POIs, with recommended visit times and approximate transit times between them.

Figure 1:
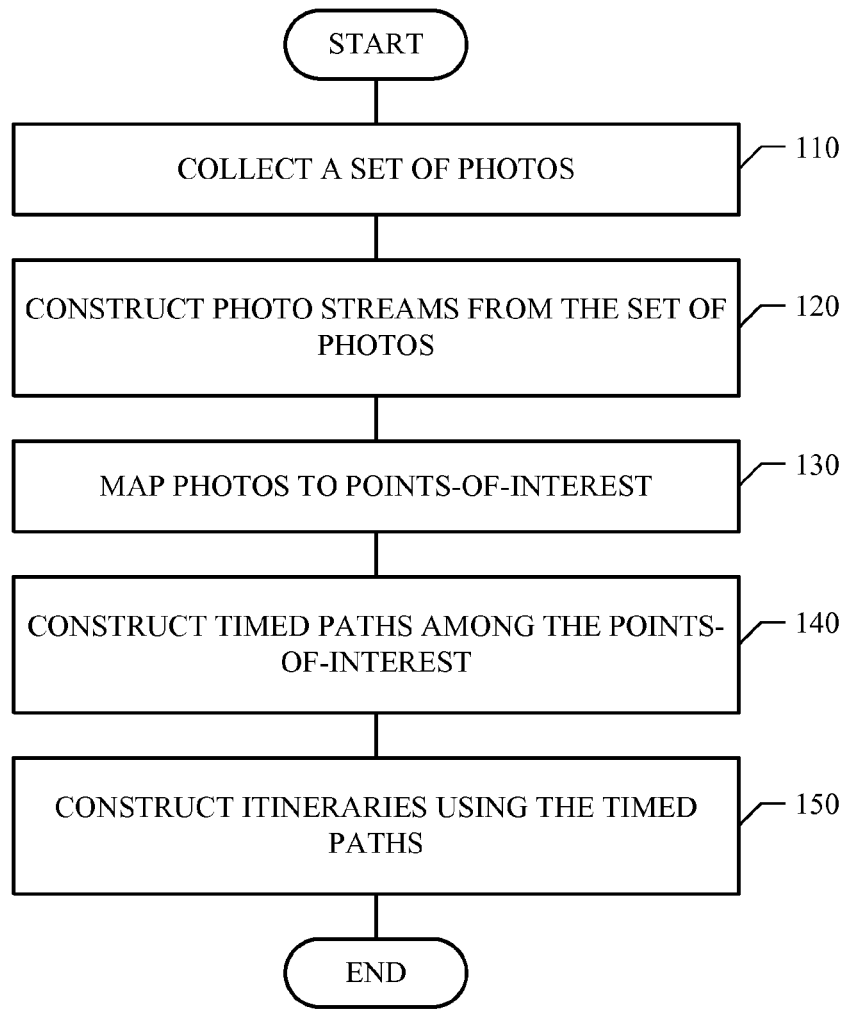
FIG. 1 illustrates an example method of constructing travel itineraries from tagged geo-temporal photographs.
Figures 2A, 2B:
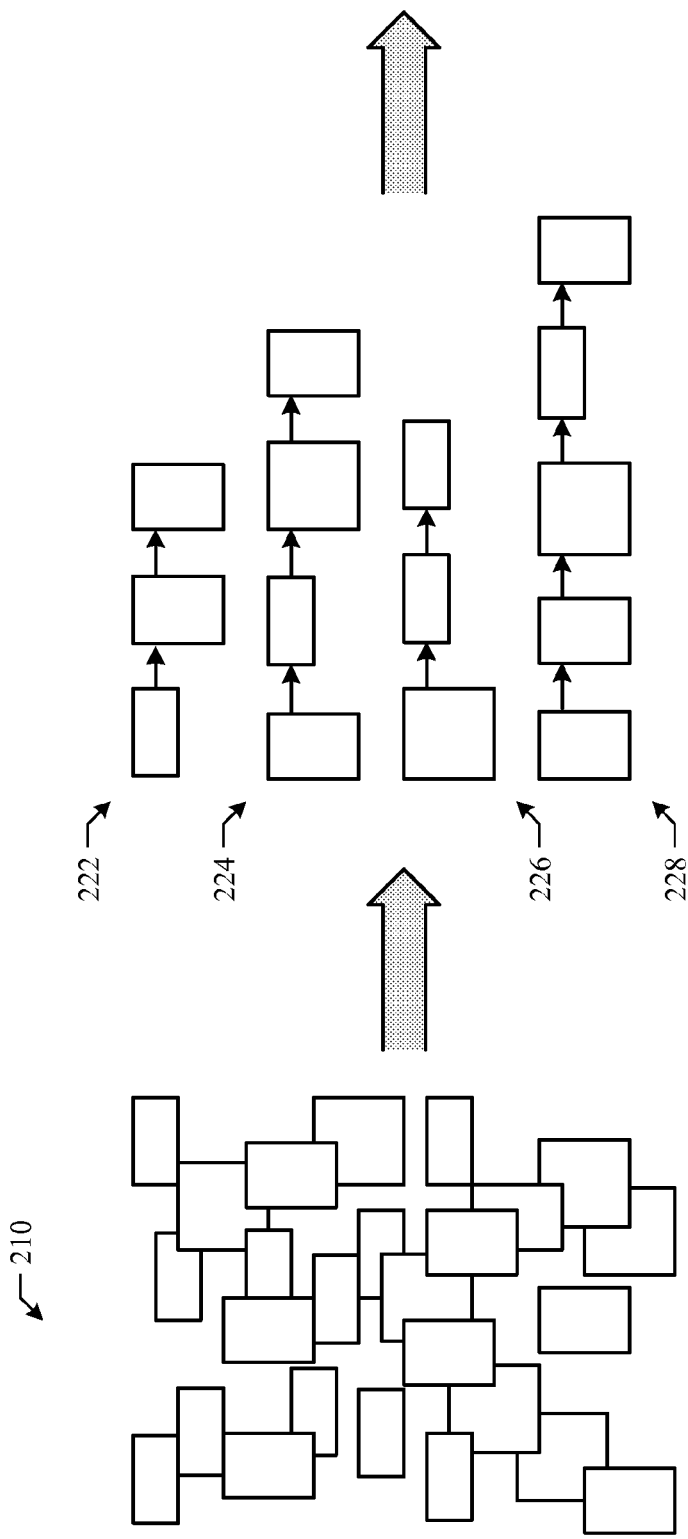
FIG. 2A illustrates an example set of photos.
FIG. 2B illustrates four example photo streams for an example destination.

FIG. 1 illustrates an example method of constructing travel itineraries from tagged geo-temporal photographs. The steps illustrated in FIG. 1 are described in connection with FIG. 2. Particular embodiments may collect a set of photos from any applicable sources (step 110). As indicated above, people often share their travel photos at various websites, such as Flickr. Particular embodiments may collect the set of photos from these websites. Particular embodiments may combine photos shared at multiple websites to form the set so that the number of photos in the set is sufficient large and thus reflecting the experiences of many travelers. FIG. 2A illustrates an example set of photos 210.

In particular embodiments, for any trip, there may be one or more destinations. A destination may be, for example and without limitation, a country, a state, a county, a city, a national park, or a mountain range. Within each destination there may be one or more POIs. A POI may be, for example and without limitation, a park, a museum, a monument, a zoo, a natural site, a historical site, a religious site, or a shopping area. Particular embodiments contemplate any applicable types of destinations and POIs. To simplify the discussion, FIG. 1 is described using cities as an example type for destinations. Thus, there may be one or more POIs within each city. However, the same concept may be applied to any type of destination.

For clarification purposes, hereafter, let $P=\{p_1, p_2, \ldots, p_{n1}\}$ denote a set of photos, $U=\{u_1, u_2, \ldots, u_{n2}\}$ denote the owners (also referred to as users) of the photos, and $C=\{c_1, c_2, \ldots, c_{n3}\}$ denote a set of cities, which is used as an example set of destinations, where n1, n2, and n3 may be any positive integer. Note that a user or an owner may also be a traveler who has taken the photos, and thus, in the context of the present disclosure, the terms "user", "owner", and "traveler" may be used interchangeably. In particular embodiments, each photo p∈P may be described by one or more attributes. For example and without limitation, for a given p, $u^p$ may identify the owner of p; $tt^p$ and $tu^p$ may indicate when p was taken and shared on a website (e.g., Flickr), respectively (i.e., temporal information); $lat^p$ and $long^p$, if available, may indicate where in terms of latitude and longitude p was taken (e.g., geographical or geo information); and $\{\theta_1^p, \theta_2^p, \ldots, \theta_{n4}^p\}$, where n4 may be any positive integer, may be the set of tags associated with p. For example, a photo of the Eiffel Tower in Paris may be tagged with "Tour Eiffel, Eiffel Tower, Architecture, Paris, Travel". In particular embodiments, each city c∈C may have a set of POIs, denoted as $L^c=\{l_1, l_2, \ldots, l_{n5}\}$, where n5 may be any positive integer. In particular embodiments, each POI l∈$L^c$ may be described by one or more attributes. For example and without limitation, $name^l$ may uniquely identify l; $City^l$ is the city to which l belong (i.e., the city within which l is located); $lat^l$ and $long^l$ are the latitude and longitude of l.

Sometimes, a website (e.g., Flickr) may allow its users to organize their photos into photo-sets, where each photo-set may include one or more related photos. Often, users may group travel-related photos into such photo-sets, with each photo-set devoted to a particular trip or destination. In addition, users may associate descriptive tags to a photo-set. In particular embodiments, the tags associated with a photo-set are propagated to all the photos within the photo-set.

Given these fundamental concepts, particular embodiments may construct photo streams for individual destinations from the set of photos (step 120). In particular embodiments, for each destination (e.g., a city), one or more photo streams may be constructed from the set of photos (e.g., set of photos 210). In particular embodiments, a photo stream may include one or more photos of the same destination and taken by the same tourist during the same trip and arranged in the order of the time that these photos were taken. In particular embodiments, photos of different destinations, from different trips, or taken by different tourists form different photo streams. Of course, people often travel in groups. It is not uncommon that several people (e.g., friends or families) may travel to a destination together, and at the destination, they may in turn take photos of each other or for each other. When they return home, one person may upload all the photos of the trip to a website, regardless of which person actually has taken which photo. As a result, all the photos may appear to be associated with this person. For the purpose of the present disclosure, particular embodiments may assume that the person who has posted a photo is the person who has taken the photo.

FIG. 2B illustrates four example photo streams 222, 224, 226, 228 for a particular city (e.g., San Francisco). For example, photo stream 222 includes three photos that may be taken by a first tourist during a visit to San Francisco. The first photo in photo stream 222 is taken before the second photo in photo stream 222, which is taken before the third photo in photo stream 222. Photo stream 224 includes four photos that may be taken by a second tourist during a visit to San Francisco. Photo stream 226 includes three photos that may be taken by a third tourist during a visit to San Francisco. Of course, a particular tourist may visit a particular destination multiple times and taken photos during each trip. Suppose the first tourist has visited San Francisco twice. Photo stream 228 includes five photos that may be taken by the first tourist during his second visit to San Francisco. Similarly, a particular tourist may visit multiple destinations during a single trip. Suppose the second tourist has visited San Francisco and Los Angeles during a single trip. The photos the second tourist has taken in San Francisco form photo stream 224. The photos the second tourist has taken in Los Angles form another, separate photo stream (not illustrated in FIG. 2B).

When constructing photo streams for any given destination, particular embodiments may consider several issues. For example, particular embodiments may need to identify, from the set of photos, those individual photos that are associated with the destination and are owned by tourists. Conversely, particular embodiments my need to prune irrelevant photos that are not associated with the destination or not owned by tourists. For example, given a city, c, pruning away irrelevant photos may involve several tasks. First, particular embodiments may identify, from the set of photos, those individual photos that are likely to be taken within the city. Second, particular embodiments may identify, from the owners of the photos, those owners who are likely to be tourists visiting the city, as opposed to, for example, residents of the city. Third, particular embodiments may remove, from those photos that have identified as likely being taken within the city, the photos whose stored photo-taken time may be inaccurate.

To identify the photos of the city, C, particular embodiments may leverage the semantic tags associated with the individual photos. Particular embodiments may collect a set of names of the city, including its proper name and various popular variants, denoted as $Name^c$. Particular embodiments may use the following RULE 1 to associated photos with the city as follows.

RULE 1 (Photo-City Association). A photo p is associated with the city c if p's set of tags, including any tags propagated from the photo-set to which p belongs, contains at least one tag matching any name variant in $Name^c$.

For example, New York City may be referred to as "New York", "NYC", "Manhattan", "the big apple", etc., which collectively form $Name^c$ for New York City. Any photo whose tags include one of these name variants is considered to be associated with New York City. Note that particular embodiments do not tap the geo information of the photos at this stage, as experiments indicate that it does not significantly improve the city-photo association and yet may be far more costly to compute. Of course, alternative embodiments may use the geo information of the photos to determine in which city the photos have been taken.

To distinguish tourists visiting a city and residents of the city, particular embodiments may rely on the observation that, with respect to POIs, city residents often exhibit different visiting patterns from typical tourists. For example, city residents usually are not under pressure to visit many POIs within a time constraint. Thus, travel itineraries generated from patterns derived from residents are not likely to be useful for tourists. To address this problem, particular embodiments may adopt the technique described in *Leveraging Explicitly Disclosed Location Information to Understand Touristic Dynamics: a Case Study*, by Fabien Girardin, Filippo Dal Fiore, Carlo Ratti, and Josep Blat, Journal of Location-Based Services, 2 (1):41-54, 2008. Particular embodiments may implement the following heuristic RULE 2:

RULE 2 (Tourist User). A user u (i.e., a owner of one or more photos) is considered as a tourist of the city c, if the span of the photo-taken times between u's first and last photos in c is no more than n days. That is, u is considered as a tourist visiting c if the first photo taken by u in c and the last photo taken by u in c is no more than n days apart.

Particular embodiments may determine the value of n based on experiments. For example, n may be empirically set to 21. The assumption here is that while most tourists concentrate their visits within a short time period from several days to a couple of weeks, residents will take pictures of the city over a much longer period of time. Particular embodiments may also enforce that a user visits at least two POIs of c to be considered as a tourist. In particular embodiments, once a user u is identified as a non-tourist to a city c, all of u's photos associated with C may be eliminated for the purpose of constructing photo streams for c.

Constructing itineraries with accurate predictions of visit and transit times requires the photos to have reliable timestamps, which, in particular embodiments, may be verified by the following RULE 3.

RULE 3 (Accurate Photo-taken time). A photo p is considered to have an accurate photo-taken time $tt^p$ if its minutes and seconds are different from those of its upload time $tu^p$. Particular embodiments may require both timestamps to be at the resolution of 1 second. Moreover, if the minutes and seconds of $tt^p$ and $tu^p$ do match, p is considered to have an accurate photo-taken time, if $tt^p$ and $tu^p$ are more than 24 hours apart.

Intuitively, differences in the seconds or minutes of $tt^p$ and $tu^p$ eliminate the possibility that the photo-taken time $tt^p$ is set by default to the up-load time $tu^p$, which is a practice adopted by some media sharing websites (e.g., Flickr) whenever the photo-taken time information is missing. The 24 hour rule may be used to recover photos mistakenly eliminated in the first round (i.e., according to the first part of RULE 3) due to, for example, the time zone differences. In particular embodiments, if a photo does not have an accurate photo-taken time according to RULE 3, it is ignored for the rest of the process.

Particular embodiments may then group all photos that satisfy all three rules by owner-destination or owner-trip-destination, and within each unique combination of owner-trip-destination, sort the photos according their photo-taken times. The result is a collection of photo streams $S^{u,t,c}$, one for each unique combination of owner, trip, and destination.

As indicated above, each photo stream includes photos of a particular destination, taken by a particular tourist, during a particular trip. Typically, during each trip, a tourist may take successive photos of various POIs at a destination, and as described in more detail below, metadata associated with the photos in each photo stream may be used to extract information concerning how much time the tourist has spent at each POI (i.e., visiting time of a POI) and how much time it has taken the tourist to travel from one POI to another POI (i.e., transit time between two POIs). During a particular trip, a tourist may spend multiple days at the same destination, visiting multiple POIs (e.g., a few POIs each day). At the end of each day, the tourist may return to his temporary lodging at the destination (e.g., a hotel) and rest. While the tourist returns to his hotel to rest each night, it is unlikely that the tourist has taken any photo while sleeping. Thus, there may be a gap in time between the last photo taken during a first day and the first photo taken during a second day. To avoid this time gap being mistakenly construed as the transit time between the last POI the tourist has visited during the first day and the first POI the tourist has visited during the second day, particular embodiments may examine the gap between the photo-taken time of the photos within each photo stream, and if there is a sufficiently long gap between two successive photos (e.g., more than 8 hours, 12 hours, 24 hours, or 48 hours), particular embodiments may divide the photo streams into two separate photo streams.

Figures 2C, 2D:
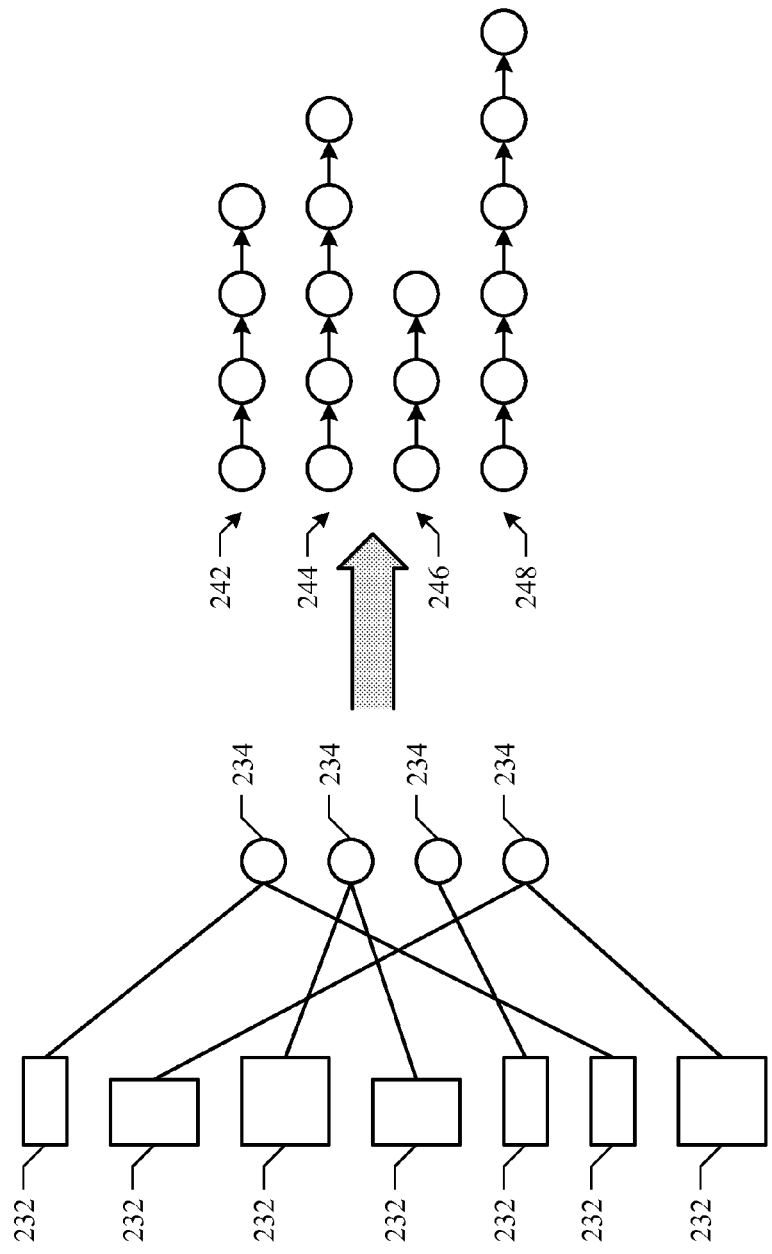
FIG. 2C illustrates an example mapping between photos and points-of-interest.
FIG. 2D illustrates four example timed paths.

For those photos that have been identified as associated with destinations and owned by tourists, particular embodiments may map them to the POIs of the destinations (step 130). Particular embodiments may, for each destination, extract its POIs and associate individual photos with the POIs (i.e., photo-POI association). FIG. 2C illustrates several example photos mapped to several example POIs. Typically, each photo 232 may be mapped to one POI 234, and several photos 232 may be mapped to the same POI 234.

The POIs of a destination may be extracted from various sources, and particular embodiments contemplate any applicable sources. For example, many websites, such as Yahoo! Travel (http://travel.yahoo.com) or Lonely Planet (http://travel.lonelyplanet.com), list attractions and POIs for many cities. Particular embodiments may rely on these websites to extract the set of popular land-marks, attractions, tourist sites, etc., collectively as a set of POIs, $L^c$, for a given city. Furthermore, particular embodiments may employ the publicly available Yahoo! Maps API (http://developer.yahoo.com/maps) to extract the geo-locations (e.g., latitudes and longitudes) of these POIs. Geo-locations are returned when querying the Yahoo! Maps API with the names of the POIs.

Given geo information of the POIs, there may be alternative methods to map a photo to a particular POI, including geo-based or tag-based methods. The geo-based mapping relies on matching the photo's geo location to the POI's geo location; and the tag-based mapping relies on matching the photo's tags to the names of the POIs. Intuitively, the geo-based mapping may be a more desirable method, especially for large and distinctive POIs that are often photographed from afar (e.g., the Golden Gate Bridge in San Francisco). Otherwise, particular embodiments may associate a photo with the POI appearing in its textual tags, even when the photo was actually taken from far away. This may be misleading when computing the visit and transit times of that POI.

If a photo has geo information, particular embodiments may associate a geo-located photo p to a POI l∈L$^c$ whenever l is the POI closest to p, and p was taken within distance δ of l. For example, δ may be set to 100 meters. Unfortunately, not all photos have associated geo information. Thus, if a photo does not have geo information, particular embodiments may apply tag-based matching as a secondary measure. Given a photo tag and the name of a POI, particular embodiments may compute the similarity between the two based on their trigram set similarity. Particular embodiments thus associate a photo p to a l∈L$^c$ whenever l has the highest similarity with any tag of p among all the POIs in L$^c$. Particular embodiments may require that the similarity satisfy a threshold requirement.

The overall POI association process, according to particular embodiments, is depicted in ALGORITHM 1. It augments the previously identified individual photo streams S$^{u,t,c}$ with associated POI information to produce the POI photo stream, S$^{u,t,c,l}$.

ALGORITHM 1: Associating Photos with POIs

Require: city-relevant photo streams S$^{u,t,c}$ ; a city c ;
1: L$^c$ = getPOIs( c );
2: for (p ∈ S$^{u,t,c}$ ) do
3:     for (l ∈ L$^c$ ) do
4:         if (geoMap( p , l ) ∥ tagMap(( p , l )) then
5:             associate(( p , l );
6:         end if
7:     end for
8: end for
9: return photo streams with photos associated with city POIs Particular embodiments may construct timed paths among the POIs (step 140). In particular embodiments, each timed path may include one or more POIs and the visit time for each POI and the transit time for each pair of POIs. The visit time for a POI may be the average time a tourist may spend visiting the POI. The transit time for a pair of POIs may be the average time it takes a tourist to travel from one POI to the other POI.

A timed path may be represented graphically. FIG. 2D illustrates four example timed paths 242, 244, 246, 248. For each timed path, the nodes represent the POIs, and each node is associated with an average visit time. Two nodes (i.e., two POIs) may be connected with an edge, which is associated with an average transit time.

From step 120, for a given tourist (i.e., user), trip, and destination (e.g., city), all the photos may be arranged according to their photo-taken time to form a photo stream. However, the information provided by such photo streams may not be readily useful, as within a photo stream, successive (i.e., adjacent) photos may have been taken on different days, and thus their corresponding POIs may have been visited by the user on different days. To address this issue, particular embodiments may segment each photo stream into sub-streams using a simple heuristic: the photo stream may be split whenever the time difference between two successive photos, tt$^{p_{i+1}}$−tt$^{p_i}$, is greater than some threshold τ. For example, based on experiments, τ may be set to 8 hours. Consequently, if a photo stream contains two successive photos that are more than τ apart, the photo stream is segmented into two sub-streams. In particular embodiments, each sub-stream containing only photos from a single POI or containing less than η number of photos (e.g., η=3) may be discarded as such sub-streams cannot reliably contribute to the computation of visit and transit times. The remaining sub-streams may then be used to construct the timed paths.

In constructing timed paths particular embodiments may rely on the notion of a timed visit, defined as follows.

DEFINITION 1 (Timed Visit). Let l∈L$^c$ be a POI of a city c. A timed visit at l is the triplet (l, t$^s$, t$^e$), where t$^s$ is the start time at l, t$^e$ is the end time at l, and t$^e$≧t$^s$.

Particular embodiments may construct timed visits at l from maximal subsequences of photos associated with l in a photo stream or a photo sub-stream. The photo-taken time stamp of the first photo associated with l in the subsequence determines t$^s$, while that of the last photo associated with l in the subsequence determines t$^e$. A timed visit implies a lower bound on the actual time spent by the particular user at that POI, since the start and end times represent the earliest time and the latest time that a photo was taken at the POI, and not the actual times of arrival at and departure from the POI.

Particular embodiments may define a timed path as follows.

DEFINITION 2 (Timed Path). A sequence of timed visits, TP$^c$={(l$_1$, t$_1^s$, t$_1^e$), . . . , (l$_k$, t$_k^s$, t$_k^e$)} is called a timed path for city c whenever t$_j^e$<t$_{j+1}^s$ for j=1, . . . , k−1. The difference t$_{j+1}^s$−t$_j^e$ is called the transit time from l$_j$ to l$_{j+1}$.

In particular embodiments, timed paths are induced by the sequence of timed visits derived from a photo stream or sub-stream. Transit times imply an upper bound on the time it took for the particular user to move from one POI to another POI. The following ALGORITHM 2 illustrates the generation of timed paths according to particular embodiments.

ALGORITHM 2: Generating Timed Paths

Require: POI-associated photo streams S$^{u,t,c,l}$ ; a city; a time threshold τ ;
1: for (s ∈ S$^{u,t,c,l}$ ) do
2:     SS = segmentStream( s , τ )
3:     for (ss ∈ SS ) do
4:         pruneNonTourists( ss )
5:         addPaths(TP$^c$ , ss)
6:     end for
7: end for
8: return timed paths TP$^c$ Given a start POI at a destination, an end POI at the destination, and a time constraint (i.e., the total time to be spent at the destination), particular embodiments may automatically construct an itinerary using the timed paths (step 150). The start POI, end POI, and time constraint may be specified by a traveler or there may be default start POI, end POI, and time constraint for a particular destination. Given the set of timed paths, the goal, in particular embodiments, is to aggregate the actions of many individual travelers into coherent itineraries while taking into consideration POI popularity. To this effect, particular embodiments may define a full undirected graph G$^c$=(V=L$^c$, E=L$^c$×L$^c$) on which the following predicates are defined:

In particular embodiments, P(l∈L$^c$) is the popularity of each POI l in L$^c$ (i.e., the number of distinct users who visited l). In particular embodiments, POIs visited by less than 10 users may be removed.

In particular embodiments, T(l∈L$^c$) is the visit time at each POI l in L$^c$. Different people may stay for different durations at a POI for many reasons, some of which transcend the value of the landmark itself (e.g. they may stop for a meal there). Moreover, a single user may visit a POI multiple times, each with a different visit time. Particular embodiments may take the longest visit of each user u at a POI as u's visit time and set T(l∈L$^c$) to be the visit time closest to, for example the 75th percentile among all users. This heuristic may overcome much of the noise and compensates for the fact that the visit times measured are only lower bounds on the real visit times.

In particular embodiments, E(e∈E) is the median or average transit time between each pair of $L^c$ POIs in $L^c$. Each timed path may contribute multiple transit times between the same pair of points. The median or average, then, is calculated over the set of all transit times collected from all timed paths. In particular embodiments, edges with a single (or no) transit in the data may be assigned a transit time of infinity. More specifically, in particular embodiments, the transmit time between each pair of POIs may be calculated using a two-step process. First, for each pair of POIs and each traveler, the median or average transmit time between the two POIs may be calculated for the individual traveler. Note that a traveler may travel between the same two POIs multiple times. Second, for each pair of POIs, the median or average transmit time between the two POIs may be calculated for all the travelers. For each pair of POIs, the final median or average transmit time obtained from the two-step calculation may be used as the transmit time between the two POIs.

In particular embodiments, $V(l \in L^c)$ is the prize or value that an itinerary gets from visiting each POI l in $L^c$, which may be a function of the popularity and visit duration of l. The dependency on the visit duration is required, in particular embodiments, to prevent bias towards POIs with short visit durations. Particular embodiments may set the prize to be the product of the popularity and the visit duration.

Note that while theoretically, transit times should obey the triangle inequality, this may not be the case with the transit times empirically collected. To overcome this difficulty and enforce the triangle inequality, particular embodiments may apply metric completion on $G^c$. The drawback of metric completion, in some cases, is that an erroneous (short) transit duration at one edge can propagate to many other edges. Filtering nodes may reduce the effect of this drawback. To further reduce it, particular embodiments may ignore transit times of edges for which fewer than a certain number of transitions, X, were recorded.

In particular embodiments, an itinerary is a path in the graph $G^c$, where a node (i.e., POI) in the path may be visited more than once. Let I be an itinerary; its prize V(I) may be defined as the sum of prizes of the unique set of POIs (i.e., a POI's prize is counted only once even if it is visited multiple times) along the path (i.e., the itinerary). The time T(I) of the itinerary is the sum of visit times to the unique set of POIs along the path, plus the transit times along all edges on the path, including those that are traversed more than once. The intuition behind counting prize and visit time only once for POIs visited multiple times is that one might pass through a POI several times, always paying the transit time, but spending visit time there to view the place only once. However, since $G^c$ satisfies the triangle inequality, particular embodiments may assume without loss of generality that an itinerary is a simple path. Under this assumption, T(I) becomes the sum of visit times of its nodes plus the transit times of its edges.

Given the definitions above, particular embodiments may formulate the Itinerary Mining Problem (IMP) as follows.

Instance: A graph $G=(L^C, E)$ with edge costs (=transit times) $\{T(e)|e \in E\}$ obeying the triangle inequality, (time) budget B, node prizes $\{V(l)|l \in L^c\}$, node costs (=visit times) $\{T(l) | l \in L^c\}$, and two nodes s,t∈$L^c$.

Objective: Find an itinerary in G from s to t of cost (=time) at most B maximizing total node prizes.

The Itinerary Mining Problem is NP-Hard, which may be proved by a reduction from the Hamiltonian Path problem. Note that IMP is closely related to the well-studied, NP-Hard Orienteering problem. In the Orienteering problem there are only edge costs (no node costs), and its classic formulation is over undirected graphs. A common extension of the Orienteering problem specifies a time window for visiting each node. A node v, then, contributes to the prize collected by a path only if the path reaches v within its time window. Time windows help model recommended visit times of POIs. In this regard, there is an incomparable approximation ratio of $$O\left(\max\left\{\log OPT, \log \frac{L_{max}}{L_{min}}\right\}\right)$$

for Orienteering with time windows, where $L_{min}$ and $L_{max}$ are the lengths of the shortest and longest time windows, respectively. Moreover, an $O(\log^2 n)$-approximation algorithm for Orienteering with time windows is described in *Improved Algorithms for Orienteering and Related Problems*, by Chandra Chekuri and Nitish Korula, SODA, pages 661-670, 2008.

Typically, the above algorithms all have large time complexity, in practice, $O(n^8)$ or worse. In a different approach, a quasi-polynomial recursive greedy approximation algorithm may be used for Orienteering, whose approximation ratio is $\lceil \log k \rceil + 1$, where k is the length of the optimal path in terms of nodes. This approximation ratio is appealing in the present context, as a reasonable itinerary is expected to visit only a relatively few POIs each day. By imposing an upper bound $\bar{k}$ on k, the time complexity of the algorithm may be reduced to $O((2+nA \log B)^{\log \bar{k}})$ Moreover, the algorithm is highly extensible.

As mentioned above, the major difference between IMP and the Orienteering problem is that IMP includes node costs. Hence particular embodiments may reduce IMP to the directed Orienteering problem by adding T(l) to the cost of each edge entering l. The idea of the recursive greedy algorithm is to guess the middle node v of the path and the amount of prize collected by the path in the first half (i.e., up to node v). The algorithm then determines how much budget has to be invested in the first half to collect the guessed prize, and calls itself recursively on both halves of the path. The second call is not allowed to use the nodes that belong to the first half of the path returned by the first call.

An extension of the recursive greedy algorithm for Orienteering (RG-QP) allows it to produce multi-day, or more specifically, multi-part, itineraries. The idea is to supply the algorithm with multiple triplets comprised of start-point (i.e., start POI), end-point (i.e., end POI), and time allowance (i.e., time constraint). Each triplet represents a "part" and corresponds to the parameters s, t and B of the IMP formulation above. Typically, the end-point of triplet j would be the start point of triplet j+1, representing the location where a tourist may spend a night. In a multi-day stay in a city, those may all be the tourist's hotel. In particular embodiments, a multi-day itinerary is considered valid if it is the concatenation of sub-itineraries that connect the source and destination nodes of the triplets while respecting the corresponding time allowance.

A limitation of this approach for automatically constructing itineraries for road trips, as opposed to multi-day city stays, may be the need to specify as input to the algorithm the "layover points". Particular embodiments may either mine recommended layover spots from user data, or to have the algorithm reach "eligible layovers" at certain intervals (e.g., every 9-10 trip hours).

Although FIG. 1 has been described with respect to photographs as a specific example of geo-temporally tagged rich media objects, the same concept may be applied to any kind of geo-temporally tagged rich media objects. A set of such objects may be obtained from any suitable sources, whether public or private.

Figure 3:
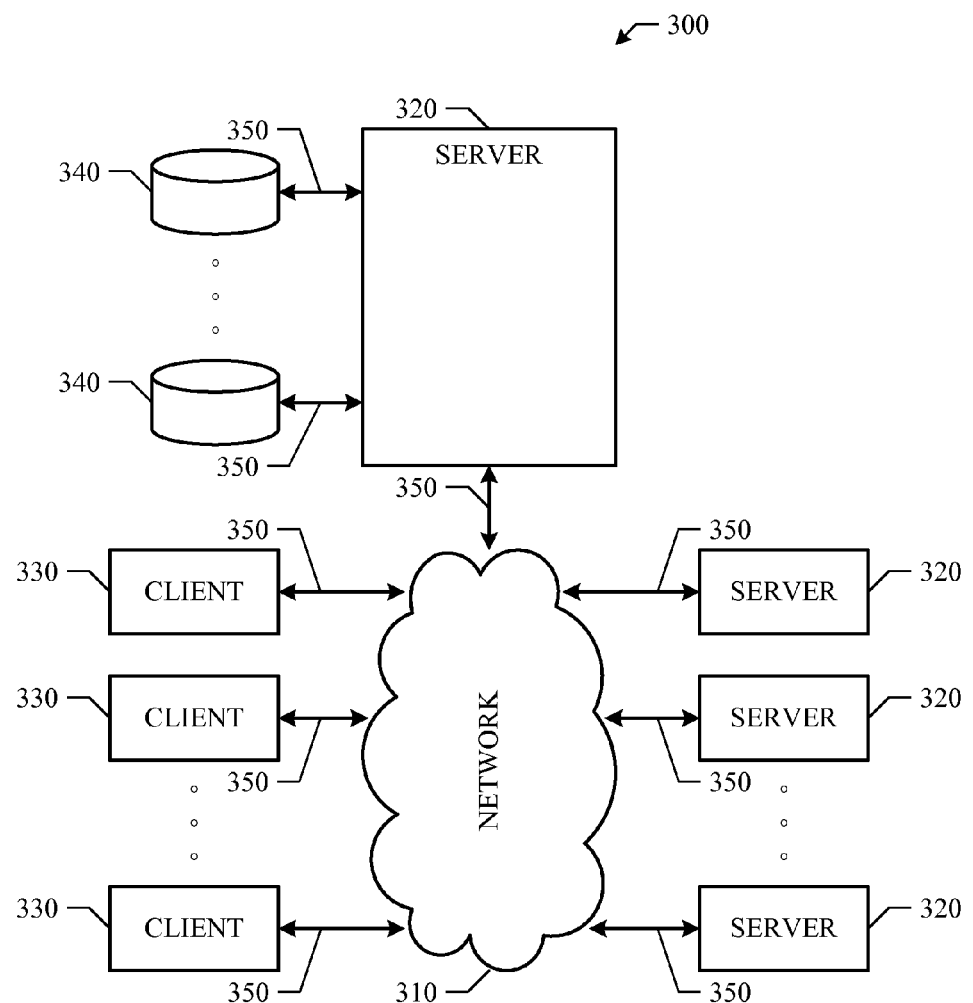
FIG. 3 illustrates an example network environment.

Particular embodiments may be implemented in a network environment. FIG. 3 illustrates an example network environment 300. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 310 or a combination of two or more such networks 310. The present disclosure contemplates any suitable network 310.

One or more links 350 couple servers 320 or clients 330 to network 310. In particular embodiments, one or more links 350 each includes one or more wired, wireless, or optical links 350. In particular embodiments, one or more links 350 each includes an intranet, an extranet, a VPN, a LAN, a WLAN, a WAN, a MAN, a communications network, a satellite network, a portion of the Internet, or another link 350 or a combination of two or more such links 350. The present disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. A client 330 may enable an network user at client 330 to access network 310. A client 330 may have a web browser, such as Microsoft Internet Explorer or Mozilla Firefox, and may have one or more add-ons, plug-ins, or other extensions, such as Google Toolbar or Yahoo Toolbar. A client 330 may enable its user to communicate with other users at other clients 330. The present disclosure contemplates any suitable clients 330.

In particular embodiments, one or more data storages 340 may be communicatively linked to one or more servers 320 via one or more links 350. In particular embodiments, data storages 340 may be used to store various types of information. In particular embodiments, the information stored in data storages 340 may be organized according to specific data structures. Particular embodiments may provide interfaces that enable servers 320 or clients 330 to manage (e.g., retrieve, modify, add, or delete) the information stored in data storage 340. In particular embodiments, the photos may be stored in data storage 340.

Figure 4:
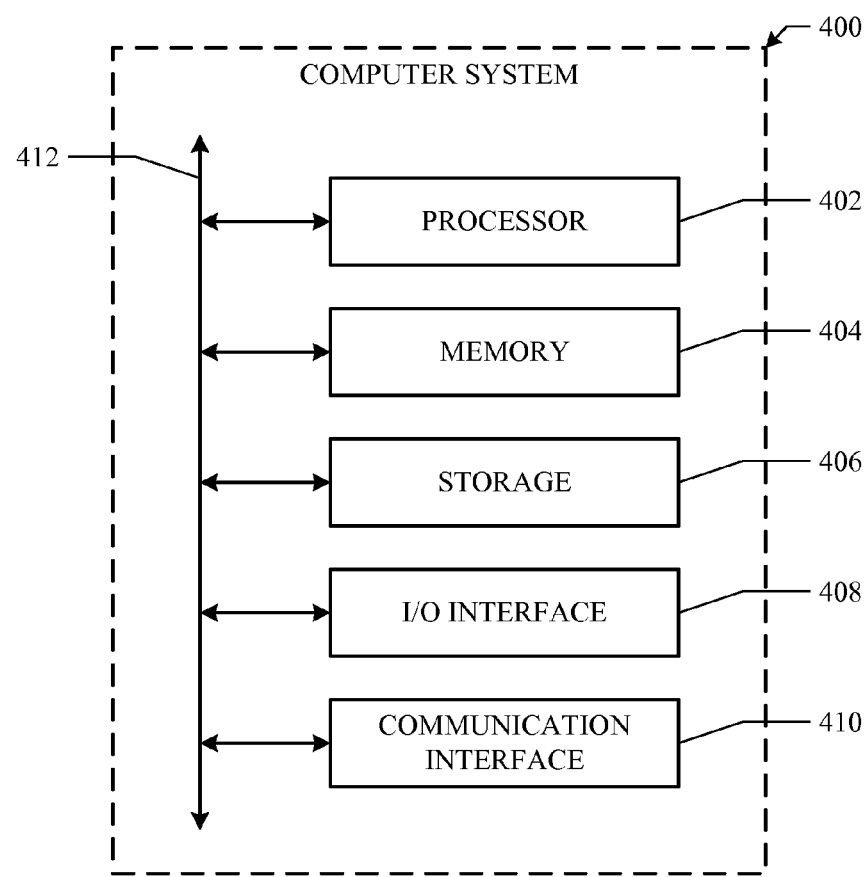
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computing devices:
   accessing:
      two or more photos, wherein each one of the photos is associated with a location and a time at which the photo is taken, and is taken by one of one or more travelers while visiting one of one or more destinations, and
      one or more points-of-interest, wherein each one of the points-of-interest is located within one of the destinations;
   constructing one or more photo streams for each unique traveler-destination combination, wherein each one of the photo streams comprises two or more of the photos taken by the corresponding traveler at the corresponding destination and ordered according to the respective times at which the photos are taken;
   mapping each one of the photos to one of the points-of-interest;
   constructing one or more timed paths for each unique traveler-destination combination based on the photo streams and the mapping between the photos and the points-of-interest, wherein each one of the timed paths comprises:
      one or more of the points-of-interest located within the corresponding destination,
      for each one of the points-of-interest located within the corresponding destination, a visit time representing a first amount of time the corresponding traveler spends at the point-of-interest, and
      for each one of one or more pairs of points-of-interest located within the corresponding destination, a transit time representing a second amount of time it takes the corresponding traveler to travel from a first one of the pair of points-of-interest to a second one of the pair of points-of-interest; and
   constructing an itinerary based on a start point-of-interest, an end point-of-interest, a time constraint, and the timed paths.

2. The method recited in claim 1, further comprising, for each one of the photo streams, between any two successive photos, if a difference between a first time at which a first one of the two successive photos is taken and a second time at which a second one of the two successive photos is taken is greater than a predetermined threshold, then dividing the photo stream into two new photo streams, replacing the old photo stream, wherein the first one of the two new photo streams comprises from a first photo to the first one of the two successive photos of the old photo stream, and the second one of the two new photo streams comprises from the second one of the two successive photos to a last photo of the old photo stream.

3. The method recited in claim 1, wherein for each one of the timed paths constructed for each traveler-destination combination:

the points-of-interest are ordered according to a sequence of the corresponding traveler visiting the points-of-interest, for each one of the points-of-interest, the visit time is a difference between a first time a first photo is taken in connection with the point-of-interest and a second time a last photo is taken in connection with the point-of-interest based on the photo streams constructed for the traveler-destination combination, and for each one of the pairs of points-of-interest, the transit time is a difference between a third time a last photo is taken in connection with the first one of the pair of points-of-interest and a fourth time a first photo is taken in connection with the second one of the pair of points-of-interest based on the photo streams constructed for the traveler-destination combination.

4. The method recited in claim 1, wherein:

each one of the points-of-interest is associated with a value determined base on popularity and visit duration of the point-of-interest, and the additional points-of-interest of the itinerary are selected to maximize a total value of the points-of-interest of the itinerary.

5. The method recited in claim 1, wherein:

the itinerary comprises the start point-of-interest, the end point-of-interest, zero or more additional points-of-interest in-between the start point-of-interest and the end point-of-interest, and a total amount of time needed to visit the start point-of-interest, the additional points-of-interest, and the end point-of-interest satisfies the time constraint.

6. The method recited in claim 5, wherein:

the start point-of-interest, the additional points-of-interest, and the end point-of-interest are located within a same one of the destinations, and the total amount of time of the itinerary comprises the visit times of all the points-of-interest of the itinerary and the transmit times between all pairs of successive points-of-interest of the itinerary.

7. A system, comprising:

a memory comprising instructions executable by one or more processors; and one or more processors coupled to the memory and operable to execute the instructions, the one or more processors being operable when executing the instructions to:

access:
  two or more photos, wherein each one of the photos is associated with a location and a time at which the photo is taken, and is taken by one of one or more travelers while visiting one of one or more destinations, and
  one or more points-of-interest, wherein each one of the points-of-interest is located within one of the destinations;

construct one or more photo streams for each unique traveler-destination combination, wherein each one of the photo streams comprises two or more of the photos taken by the corresponding traveler at the corresponding destination and ordered according to the respective times at which the photos are taken;

map each one of the photos to one of the points-of-interest;

construct one or more timed paths for each unique traveler-destination combination based on the photo streams and the mapping between the photos and the points-of-interest, wherein each one of the timed paths comprises:

one or more of the points-of-interest located within the corresponding destination, for each one of the points-of-interest located within the corresponding destination, a visit time representing a first amount of time the corresponding traveler spends at the point-of-interest, and for each one of one or more pairs of points-of-interest located within the corresponding destination, a transit time representing a second amount of time it takes the corresponding traveler to travel from a first one of the pair of points-of-interest to a second one of the pair of points-of-interest; and construct an itinerary based on a start point-of-interest, an end point-of-interest, a time constraint, and the timed paths.

8. The system recited in claim 7, wherein the one or more processors are further operable when executing the instructions to, for each one of the photo streams, between any two successive photos, if a difference between a first time at which a first one of the two successive photos is taken and a second time at which a second one of the two successive photos is taken is greater than a predetermined threshold, then divide the photo stream into two new photo streams, replacing the old photo stream, wherein the first one of the two new photo streams comprises from a first photo to the first one of the two successive photos of the old photo stream, and the second one of the two new photo streams comprises from the second one of the two successive photos to a last photo of the old photo stream.

9. The system recited in claim 7, wherein for each one of the timed paths constructed for each traveler-destination combination:

the points-of-interest are ordered according to a sequence of the corresponding traveler visiting the points-of-interest, for each one of the points-of-interest, the visit time is a difference between a first time a first photo is taken in connection with the point-of-interest and a second time a last photo is taken in connection with the point-of-interest based on the photo streams constructed for the traveler-destination combination, and for each one of the pairs of points-of-interest, the transit time is a difference between a third time a last photo is taken in connection with the first one of the pair of points-of-interest and a fourth time a first photo is taken in connection with the second one of the pair of points-of-interest based on the photo streams constructed for the traveler-destination combination.

10. The system recited in claim 7, wherein:

each one of the points-of-interest is associated with a value determined base on popularity and visit duration of the point-of-interest, and the additional points-of-interest of the itinerary are selected to maximize a total value of the points-of-interest of the itinerary.

11. The system recited in claim 7, wherein:

the itinerary comprises the start point-of-interest, the end point-of-interest, zero or more additional points-of-interest in-between the start point-of-interest and the end point-of-interest, and a total amount of time needed to visit the start point-of-interest, the additional points-of-interest, and the end point-of-interest satisfies the time constraint.

12. The system recited in claim 11, wherein:

the start point-of-interest, the additional points-of-interest, and the end point-of-interest are located within a same one of the destinations, and the total amount of time of the itinerary comprises the visit times of all the points-of-interest of the itinerary and the transmit times between all pairs of successive points-of-interest of the itinerary.

13. One or more computer-readable tangible storage media embodying software operable when executed by one or more computer systems to:
  access:
    two or more photos, wherein each one of the photos is associated with a location and a time at which the photo is taken, and is taken by one of one or more travelers while visiting one of one or more destinations, and
    one or more points-of-interest, wherein each one of the points-of-interest is located within one of the destinations;
  construct one or more photo streams for each unique traveler-destination combination, wherein each one of the photo streams comprises two or more of the photos taken by the corresponding traveler at the corresponding destination and ordered according to the respective times at which the photos are taken;
  map each one of the photos to one of the points-of-interest;
  construct one or more timed paths for each unique traveler-destination combination based on the photo streams and the mapping between the photos and the points-of-interest, wherein each one of the timed paths comprises:
    one or more of the points-of-interest located within the corresponding destination,
    for each one of the points-of-interest located within the corresponding destination, a visit time representing a first amount of time the corresponding traveler spends at the point-of-interest, and
    for each one of one or more pairs of points-of-interest located within the corresponding destination, a transit time representing a second amount of time it takes the corresponding traveler to travel from a first one of the pair of points-of-interest to a second one of the pair of points-of-interest; and
  construct an itinerary based on a start point-of-interest, an end point-of-interest, a time constraint, and the timed paths.

14. The media recited in claim 13, wherein the software is further operable when executed by the one or more computer systems to, for each one of the photo streams, between any two successive photos, if a difference between a first time at which a first one of the two successive photos is taken and a second time at which a second one of the two successive photos is taken is greater than a predetermined threshold, then divide the photo stream into two new photo streams, replacing the old photo stream, wherein the first one of the two new photo streams comprises from a first photo to the first one of the two successive photos of the old photo stream, and the second one of the two new photo streams comprises from the second one of the two successive photos to a last photo of the old photo stream.

15. The media recited in claim 13, wherein for each one of the timed paths constructed for each traveler-destination combination:
  the points-of-interest are ordered according to a sequence of the corresponding traveler visiting the points-of-interest,
  for each one of the points-of-interest, the visit time is a difference between a first time a first photo is taken in connection with the point-of-interest and a second time a last photo is taken in connection with the point-of-interest based on the photo streams constructed for the traveler-destination combination, and
  for each one of the pairs of points-of-interest, the transit time is a difference between a third time a last photo is taken in connection with the first one of the pair of points-of-interest and a fourth time a first photo is taken in connection with the second one of the pair of points-of-interest based on the photo streams constructed for the traveler-destination combination.

16. The media recited in claim 13, wherein:
  each one of the points-of-interest is associated with a value determined base on popularity and visit duration of the point-of-interest, and
  the additional points-of-interest of the itinerary are selected to maximize a total value of the points-of-interest of the itinerary.

17. The media recited in claim 13, wherein:
  the itinerary comprises the start point-of-interest, the end point-of-interest, zero or more additional points-of-interest in-between the start point-of-interest and the end point-of-interest, and
  a total amount of time needed to visit the start point-of-interest, the additional points-of-interest, and the end point-of-interest satisfies the time constraint.

18. The media recited in claim 17, wherein:
  the start point-of-interest, the additional points-of-interest, and the end point-of-interest are located within a same one of the destinations, and
  the total amount of time of the itinerary comprises the visit times of all the points-of-interest of the itinerary and the transmit times between all pairs of successive points-of-interest of the itinerary.

* * * * *